Dec. 1, 1925.
S. RUBIO
1,563,528
KNEE OR FOOT REST FOR SHOVELS AND THE LIKE
Filed April 28, 1924
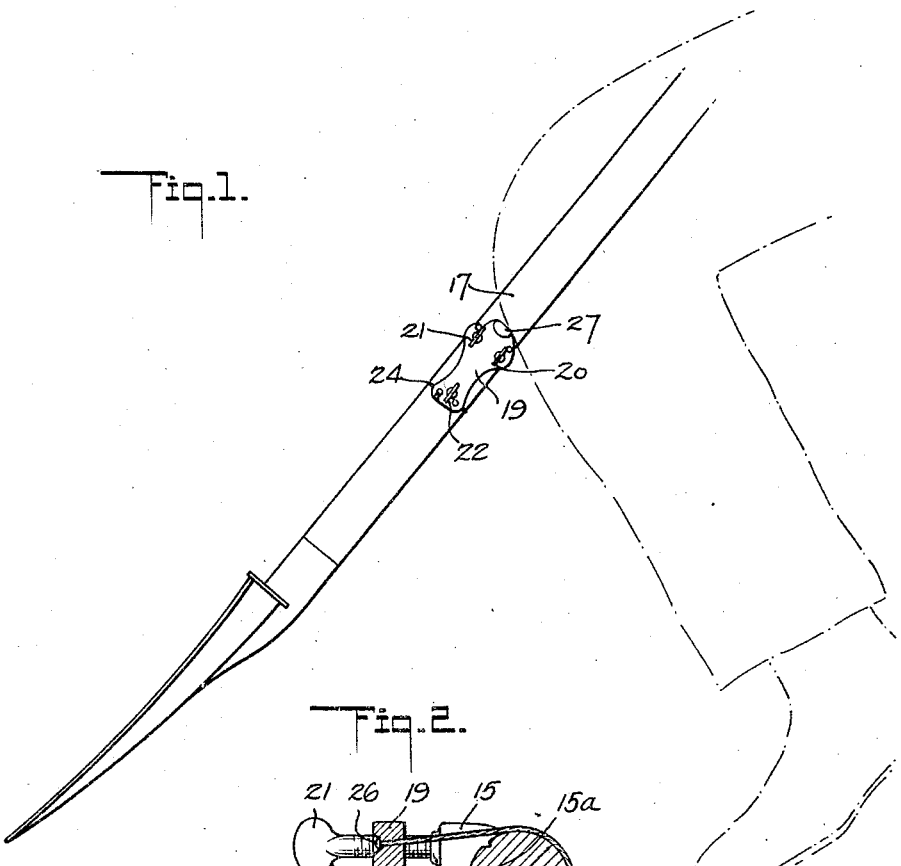
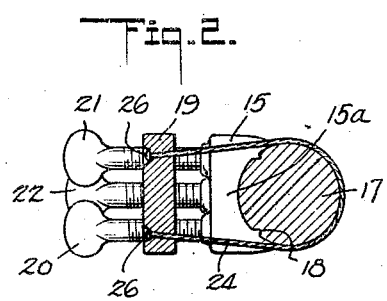
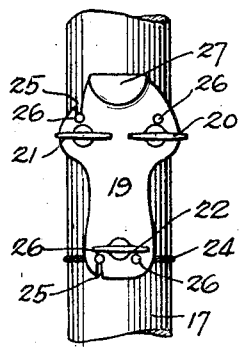
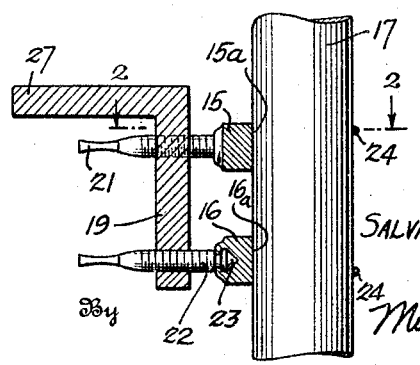
Inventor
SALVADOR RUBIO
By Munn & Co.
Attorneys Patented Dec. 1, 1925.

1,563,528

UNITED STATES PATENT OFFICE.

SALVADOR RUBIO, OF LOS ANGELES, CALIFORNIA.

KNEE OR FOOT REST FOR SHOVELS AND THE LIKE.

Application filed April 28, 1924. Serial No. 709,625.

*To all whom it may concern:*

Be it known that I, SALVADOR RUBIO, a citizen of the Republic of Guatemala, and a resident of Los Angeles, in the county of Los Angeles and State of California, have invented certain new and useful Improvements in Knee or Foot Rests for Shovels and the like, of which the following is a specification.

My invention relates to and has for its purpose the provision of a device adapted to be attached to the handle of a spade or shovel to provide a knee or foot rest by which the weight of the operator can be applied to the shovel in forcing the blade thereof into the earth.

It is also a purpose of my invention to provide a knee or foot rest of simple, durable and efficient construction, and one which can be quickly adjusted longitudinally upon the handle of the shovel or other earth working implement.

I will describe only one form of knee or foot rest embodying my invention, and will then point out the novel features thereof in claims.

In the accompanying drawings—

Figure 1 is a view showing in side elevation a conventional form of shovel having applied to the handle thereof one form of knee or foot rest embodying my invention;

Figure 2 is a transverse sectional view taken on the line 2—2 of Figure 4;

Figure 3 is an enlarged view showing in front elevation the knee or foot rest shown in Figure 1;

Figure 4 is a vertical sectional view of the knee or foot rest in applied position to the shovel handle.

Referring specifically to the drawings, in which similar characters of reference indicate similar parts, my invention in its present embodiment comprises a pair of metallic castings 15 and 16 having curved faces 15ª and 16ª, respectively, to conform to the curvature of a shovel handle 17, these faces being formed with spurs 18 which are adapted to embed themselves within the wooden handle 17 so as to prevent movement of the casing circumferentially of the handle. These castings 15 and 16 constitute the fixed jaws of the device and provide supporting means for thumb screws upon which a movable jaw 19 is mounted. In the present instance I have shown the upper jaw 15 provided with two thumb screws 20 and 21, while the lower jaw 16 is provided with a single thumb screw 22. As clearly illustrated in Figure 4, the screws 21 and 22 are provided with heads 23 which are rotatably fitted in suitable sockets formed in the jaws 15 and 16 so as to allow rotation of the screws on the jaws.

The movable jaw 19 is provided with openings threaded to receive the screws 20, 21 and 22 so that when the screws are rotated the jaw is adjustable horizontally and toward or away from the fixed jaws 15 and 16. This movable jaw is provided for the purpose of securing the device as a unit to the shovel handle 17, and to this end short lengths of cables 24 are permanently secured within the jaw 19 at one end and removably secured in slots 25 at the other, the cables being provided at both ends with heads 26 which serve to retain the cables against displacement from the jaw. These cables are of such length as to permit their being trained about the handle 17, as clearly illustrated in Figure 2, and by manipulation of the screws 20, 21 and 22 the jaw 19 can be adjusted outwardly with respect to the jaws 15 and 16 to cause the cables to securely embrace the shovel handle and thereby maintain the jaws 15 and 16 in firm engagement with the handle. In this manner the device as a whole is locked against longitudinal movement upon the shovel handle.

It is to be understood that when it is desired to remove the device from the shovel handle or to adjust it longitudinally thereon, the jaw 19 is moved inwardly until the cables are slackened sufficiently to allow the removal of their free ends from the slots 25, whereupon the jaws 15 and 16 can be moved free of the handle 17 and thus permit the desired longitudinal adjustment.

The jaw 19 is provided at its upper end with a lateral projection or bar 27 which provides means against which the foot or knee of the operator bears for the purpose of forcing the blade of the shovel into the earth. In practice, the device is applied to the handle of the shovel in the manner previously described, and to that point thereon which is most convenient for the operator to apply his foot or knee. The invention is particularly designed as a knee rest, as illustrated in Figure 1, so as to facilitate the movement of the shovel blade into the earth. It will be clear that with the knee applied to the device as shown in Figure 1, the weight of the body can be exerted upon the shovel to cause the blade to penetrate the earth in loosening the latter for the purpose of loading the shovel.

Although I have herein shown and described only one form of knee or foot rest for shovels and the like embodying my invention, it is to be understood that various changes and modifications may be made herein without departing from the spirit of the invention and the spirit and scope of the appended claims.

What I claim is:

1. A knee or foot rest for earth working implements comprising a stationary jaw adapted for engagement with the handle of an implement, a movable jaw adjustable on the stationary jaw, a bar carried by the movable jaw, and a flexible element connected to the adjustable jaw and adapted to embrace the handle whereby, upon adjustment of the jaw, the flexible element and the stationary jaw will be caused to tightly embrace the handle.

2. A knee or foot rest for earth working implements comprising an element adapted to be engaged by the knee or foot, and means for securing the element in fixed position upon and at any point along the length of the handle of an earth working implement, said means including flexible members adapted to embrace the handle.

3. A knee or foot rest for earth working implements comprising an element adapted to be engaged by the knee or foot, means for securing the element in fixed position upon and at any point along the length of the handle of an earth working implement, stationary jaws, a movable jaw, and flexible members connected to the movable jaw adapted to embrace the handle.

4. A knee or foot rest for earth working implements comprising a pair of stationary jaws having curved surfaces provided with spurs, screws rotatably mounted on the jaws, a movable jaw mounted on the screws, a bar secured to the movable jaw, and flexible members connected to the movable jaw.

5. A knee or foot rest for earth working implements comprising a pair of stationary jaws having curved surfaces provided with spurs, screws rotatably mounted on the jaws, a movable jaw mounted on the screws, a bar secured to the movable jaw, and flexible members having one of their ends permanently connected to the movable jaw and the opposite end detachably connected thereto in the manner and for the purpose described.

6. A knee or foot rest for earth working implements comprising a stationary jaw having a curved surface provided with spurs, a screw rotatably mounted on the jaw, a movable jaw adjustable on the screw, an angular projection on the movable jaw, and a flexible member connected to the movable jaw in the manner and for the purpose described.

7. A knee or foot rest for earth working implements comprising a stationary jaw adapted for engagement with the handle of an implement, a movable jaw adjustable on the stationary jaw, a member carried by the movable jaw, and an element connected to the adjustable jaw and adapted to embrace the handle whereby, upon adjustment of the jaw, the element and the stationary jaw will be caused to tightly embrace the handle.

8. A knee or foot rest for earth working implements comprising a pair of stationary jaws having curved surfaces, screws rotatably mounted on the jaws, a movable jaw mounted on the screws, a member secured to the movable jaw, and flexible members connected to the movable jaw.

9. A knee or foot rest for earth working implements comprising a stationary jaw having a curved surface, a movable jaw, elements movably mounted on the stationary jaw to effect an adjustment of the movable jaw, and a flexible member connected to the movable jaw in the manner and for the purpose described.

SALVADOR RUBIO.